US008517406B2

(12) United States Patent  (10) Patent No.: US 8,517,406 B2
Diekman et al.  (45) Date of Patent: Aug. 27, 2013

(54) POSITION-ADJUSTABLE VEHICLE

(75) Inventors: Robert L. Diekman, Springboro, OH (US); Donald K. Jessie, Jr., Middletown, OH (US)

(73) Assignee: Huffy Corporation, Centerville, OH (US)

( * ) Notice: Subject to any disclaimer, the term of this patent is extended or adjusted under 35 U.S.C. 154(b) by 455 days.

(21) Appl. No.: 12/795,908

(22) Filed: Jun. 8, 2010

(65) Prior Publication Data

US 2010/0308561 A1  Dec. 9, 2010

Related U.S. Application Data

(60) Provisional application No. 61/184,951, filed on Jun. 8, 2009.

(51) Int. Cl.
*B62K 9/02* (2006.01)
(52) U.S. Cl.
USPC ........... 280/282; 280/287; 280/278; 280/279; 280/288
(58) Field of Classification Search
USPC .......................... 280/282, 287, 278, 279, 288
See application file for complete search history.

(56) References Cited

U.S. PATENT DOCUMENTS

| 371,234 A | 10/1887 | Veeder |
| 393,904 A | 12/1888 | Henry |
| 600,046 A | 3/1898 | Sparks |
| 1,326,148 A | 12/1919 | Hudry |
| 1,379,305 A | 5/1921 | Johns |
| 2,294,839 A | 9/1942 | Duffy |
| 2,494,519 A | 1/1950 | Persons |
| 2,519,027 A | 8/1950 | Disney et al. |
| 2,619,364 A | 11/1952 | Carson |
| 2,707,111 A | 4/1955 | Spenner |
| 2,994,213 A | 8/1961 | Arnold et al. |
| D200,947 S | 4/1965 | Bird |
| D200,993 S | 4/1965 | Timms |
| D200,994 S | 4/1965 | Timms |
| D210,759 S | 4/1968 | Persons |
| 3,608,917 A | 9/1971 | Cogliano |

(Continued)

FOREIGN PATENT DOCUMENTS

| DE | 10 2005 046 125 | 4/2007 |
| JP | 2003-175876 | 6/2003 |

OTHER PUBLICATIONS

Blaine R. Copenheaver; Search Report and Written Opinion issued in related PCT Application No. PCT/US2010/037754; Aug. 6, 2010; 11 pages; PCT—U.S. Patent and Trademark Office.

*Primary Examiner* — Tashiana Adams
*Assistant Examiner* — Marlon Arce
(74) *Attorney, Agent, or Firm* — Wood, Herron & Evans, LLP

(57) ABSTRACT

A movable vehicle includes a first frame member, a second frame member, and a biasing mechanism. The first frame member includes a front wheel and a handlebar configured to turn the front wheel in various directions. The second frame member has at least one rear wheel and is coupled to the first frame member such that the first frame member can rotate with respect to the second frame member. The biasing mechanism is operatively coupled to the first and second frame members and biases the front wheel in a preferred direction, such as a straight direction. The biasing mechanism may include a resilient gasket and a cavity having at least partially corresponding polygonal cross sections.

16 Claims, 12 Drawing Sheets

(56) References Cited

U.S. PATENT DOCUMENTS

| | | |
|---|---|---|
| D224,326 S | 7/1972 | Ewers |
| 3,860,264 A | 1/1975 | Douglas et al. |
| 3,890,672 A | 6/1975 | Berthagen |
| 3,905,618 A | 9/1975 | Miranda |
| 3,990,716 A | 11/1976 | Dows |
| 4,079,957 A | 3/1978 | Blease |
| 4,103,917 A | 8/1978 | Widolf |
| 4,363,516 A | 12/1982 | Braly et al. |
| 4,433,852 A | 2/1984 | Hon |
| 4,448,435 A * | 5/1984 | Hon ............... 280/278 |
| 4,457,529 A | 7/1984 | Shamie et al. |
| 4,546,991 A | 10/1985 | Allen et al. |
| 4,657,270 A * | 4/1987 | Allen et al. ............... 280/7.1 |
| 4,674,761 A | 6/1987 | Kassai |
| 4,714,261 A | 12/1987 | Kassai |
| 4,768,826 A | 9/1988 | Kashima |
| 5,279,181 A | 1/1994 | Boudreau |
| 5,364,160 A | 11/1994 | Fritschen et al. |
| 5,419,573 A | 5/1995 | Kao |
| 5,499,834 A | 3/1996 | Pasin et al. |
| 5,568,934 A | 10/1996 | Niemeyer |
| 5,657,958 A | 8/1997 | McLaughlin et al. |
| 5,836,600 A | 11/1998 | Chiu |
| 6,003,890 A | 12/1999 | Inouye |
| 6,152,473 A | 11/2000 | Shih |
| 6,347,777 B1 | 2/2002 | Webber et al. |
| 6,378,884 B1 * | 4/2002 | Kettler ............... 280/279 |
| 6,491,312 B2 | 12/2002 | Reynolds et al. |
| 6,530,589 B1 | 3/2003 | Ma |
| 6,575,486 B2 | 6/2003 | Ma |
| 6,601,862 B2 | 8/2003 | Kettler |
| 6,609,723 B2 | 8/2003 | Chuang |
| 6,612,970 B2 | 9/2003 | Forcillo |
| 6,685,206 B1 | 2/2004 | Blake |
| 6,685,207 B1 | 2/2004 | Blake |
| 6,752,453 B1 * | 6/2004 | Yapp ............... 297/215.14 |
| 6,799,772 B2 | 10/2004 | Kettler et al. |
| 6,874,802 B2 | 4/2005 | Gunter et al. |
| 6,886,845 B2 | 5/2005 | Chao |
| 6,935,649 B2 | 8/2005 | Lim |
| 6,966,572 B2 | 11/2005 | Michelau et al. |
| 6,976,687 B2 | 12/2005 | Beleski, Jr. |
| 7,000,935 B2 | 2/2006 | Gunter et al. |
| 7,055,841 B2 | 6/2006 | Buhrman |
| D524,699 S | 7/2006 | Kurth et al. |
| 7,086,657 B2 | 8/2006 | Michelau et al. |
| D535,918 S | 1/2007 | On |
| 7,156,408 B2 | 1/2007 | Kettler et al. |
| 7,159,882 B2 | 1/2007 | Buhrman |
| D540,717 S | 4/2007 | On |
| 7,210,696 B2 | 5/2007 | Kettler et al. |
| 7,296,813 B2 * | 11/2007 | Montague et al. ............... 280/279 |
| 7,300,066 B2 | 11/2007 | Kettler et al. |
| 7,318,623 B2 | 1/2008 | Shook |
| 7,419,458 B2 | 9/2008 | Forcillo |
| 7,455,308 B2 | 11/2008 | Michelau et al. |
| 7,487,988 B2 | 2/2009 | Kettler et al. |
| 7,658,252 B2 * | 2/2010 | Shapiro ............... 180/208 |
| D621,304 S * | 8/2010 | Jessie, Jr. ............... D12/112 |
| 8,262,114 B2 * | 9/2012 | Jessie, Jr. ............... 280/279 |
| 2002/0139217 A1 * | 10/2002 | Montague et al. ............... 74/493 |
| 2003/0080533 A1 | 5/2003 | Ma |
| 2003/0098567 A1 | 5/2003 | Chuang |
| 2003/0141695 A1 | 7/2003 | Chen |
| 2004/0053750 A1 | 3/2004 | Forcillo |
| 2004/0061304 A1 | 4/2004 | Lim |
| 2004/0164514 A1 | 8/2004 | Gunter et al. |
| 2005/0110239 A1 | 5/2005 | Michelau et al. |
| 2005/0263981 A1 | 12/2005 | Kettler et al. |
| 2006/0001234 A1 | 1/2006 | Michelau et al. |
| 2006/0078376 A1 | 4/2006 | Liao |
| 2006/0082097 A1 | 4/2006 | Michelau et al. |
| 2006/0237947 A1 | 10/2006 | Michelau et al. |
| 2007/0018424 A1 | 1/2007 | Ray |
| 2007/0046081 A1 | 3/2007 | Shook |
| 2007/0132203 A1 | 6/2007 | Yamakoshi |
| 2007/0182124 A1 | 8/2007 | Kettler et al. |
| 2007/0222173 A1 | 9/2007 | Huang |
| 2007/0267844 A1 | 11/2007 | Grossman |
| 2008/0277901 A1 | 11/2008 | Catelli |

* cited by examiner

POSITION-ADJUSTABLE VEHICLE

CROSS-REFERENCE TO RELATED APPLICATIONS

This application claims the benefit of U.S. Provisional Patent Application No. 61/184,951, filed Jun. 8, 2009, the specification of which is hereby incorporated by reference in its entirety.

TECHNICAL FIELD

The invention relates generally to pedal-driven vehicles and the like and, more particularly, to a tricycle having features configured to improve its use and functionality.

BACKGROUND

Pedal-driven vehicles such as bicycles and tricycles are among the most popular items for children. Although many developments have improved the original tricycle design, conventional tricycle designs continue to have shortcomings that manufacturers strive to improve upon. In this regard, there are several versions or types of tricycles that are offered to today's consumers. For example, one type of tricycle is a conventional tricycle design wherein the front wheel is positioned substantially underneath the handlebar and the saddle is located relatively high on the frame. Such a conventional tricycle design is referred to herein as a high rider. Another type of tricycle, however, has a chopper design wherein the front wheel is located forward of the handlebar and the saddle is positioned relatively low on the frame. Such a modified tricycle is referred to herein as a low rider.

Conventionally, if a child desired both types of tricycle, his or her parents had to purchase two separate tricycles each having the desired configuration. However, in some instances, convertible tricycles have been made available capable of converting between the conventional high rider configuration and a low rider configuration. In this regard, these convertible devices typically include costly, relatively complex mechanisms for converting between the two configurations. Additionally, these mechanisms may include exposed parts or surfaces that present relatively sharp edges, provide potential pinch points, and/or pose other safety concerns to the user of the convertible tricycle.

Another concern for manufacturers is directed to the turning angle or radius of tricycles. In this regard, conventional tricycles are designed such that the handlebar may be rotated at least 90° in either direction, and in many cases, are designed to be able to rotate a full 360°. In some circumstances, children may attempt to turn the handlebar too sharply causing the tricycle to become unstable and possibly overturning. To avoid such outcomes, some tricycles include various mechanisms that limit the turning angle of the handlebar to a specified range. These mechanisms include, for example, hard, fixed stops that prevent the handlebar from being turned beyond the limit points. However, in many instances these mechanisms are likewise costly and complex in their design.

A related drawback to current tricycle designs is directed to maintaining the front wheel of the tricycle in the forward direction. In this regard, many tricycle designs allow for a parent or other person to push the tricycle, such as when the child cannot reach the pedals or have the strength to rotate the pedals. For example, elongated handles may be coupled to the tricycle that facilitate pushing the tricycle from behind. While these handles allow the tricycle to be pushed, the child often maintains control over the handlebar. In some instances, the child will turn the handlebar and then release his or her force thereon. Upon releasing the force on the handlebar, however, the handlebar will typically remain in the turning position. Consequently, to cause the tricycle to move in the forward direction again, the parent will have to reach down and around the child to manually turn the handlebar in the forward direction. Such steering correction, especially when repeated numerous times, can be a source of frustration. Some manufacturers provide locking mechanisms that simply lock the handlebar in the forward direction. Such locking mechanisms, while effective for maintaining the handlebar in the forward direction, prevent the child from learning how to steer and detract from the overall enjoyment of the tricycle. This may cause the child to lose interest and stop riding the tricycle altogether.

Another shortcoming of conventional tricycles for which manufacturers strive to improve upon is assembly. In this regard, tricycles are typically shipped to retail stores and sold to customers in a disassembled state. Some retail stores will assemble the tricycle for an additional cost. Many consumers, however, forgo this additional cost and choose to assemble the tricycle at home. In many cases, consumers find home assembly of these tricycles highly time consuming and frustrating. For example, the tricycle typically includes multiple, separate parts, such as the saddle, main frame, wheel fork, wheels, handlebars, etc., that must be coupled together with screws, nuts, clamps, or other connecting members. To this end, the consumer must typically have an array of tools available to properly assemble the tricycle.

In addition to the above, many of the parts have to be properly oriented and aligned relative to an adjacent component to ensure proper operation. For example, the front wheel and the handlebar must be aligned such that when the handlebar is in the forward direction, the front wheel is also in the forward direction. Moreover, the saddle must be properly aligned relative to the frame. Achieving the proper orientation and alignment may be a result of a trial-and-error approach that is time consuming and a source of frustration with the consumer.

Thus, while conventional tricycles are generally successful for their intended purpose, there remains a need for improved tricycle designs that address these and other shortcomings in conventional tricycle construction.

SUMMARY

According to one embodiment of the invention, a movable vehicle includes a first frame member, a second frame member, and a pivot joint coupling the first and second frame members. The pivot joint permits relative rotation of the first and second frame members. The pivot joint includes a first tubular member coupled to the first frame member. The first tubular member has a first end, a second end, and a side wall extending between the first and second ends to define a passage through the first tubular member. The pivot joint also includes a second elongate member coupled to the second frame member. The second elongate member is disposed through the passage of the first tubular member.

The pivot joint further includes a locking mechanism for fixing the relative rotational positions of the first and second frame members. The locking mechanism includes at least one projection coupled to one of the first tubular member or the second elongate member. The locking mechanism also has at least one aperture formed in the other of the first tubular member or the second elongate member. When the at least one projection engages the at least one aperture, the relative rotational positions of the first and second frame members are fixed. For example, the first and second frame members can be locked in a plurality of operating configurations.

In another embodiment, a movable vehicle includes a first frame member, a second frame member, and a biasing mechanism. The first frame member includes a front wheel and a handlebar configured to turn the front wheel in various directions. The second frame member has at least one rear wheel and is coupled to the first frame member such that the first frame member can rotate with respect to the second frame member. The biasing mechanism is operatively coupled to the first and second frame members and biases the front wheel in a preferred direction, such as a straight direction. The biasing mechanism may include a resilient gasket and a cavity having at least partially corresponding polygonal cross sections.

In yet another embodiment, a movable vehicle includes a first frame member, a second frame member, and a saddle. The first frame member has a first stem portion coupled to a handlebar and a second stem portion coupled to a front wheel. The first and second stem portions are also coupled to permit the handlebar to turn the front wheel in various directions. The second frame member has a saddle receiver post and is coupled to at least one rear wheel. The second frame member is coupled to the first frame member so as to allow relative rotation of the first and second frame members. The saddle further includes a base post configured to be coupled to the saddle receiver post. Additionally, at least two of the first stem portion, the second stem portion, the saddle receiver post, and the base post are non-circular in cross section. For example, the first and second stem portions may have corresponding polygonal cross-sectional shapes to permit only telescoping relative movement of the first and second stem portions. Similarly, the base post and the saddle receiver post may have corresponding polygonal cross-sectional shapes to permit only telescoping relative movement of the base post and the saddle receiver post.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
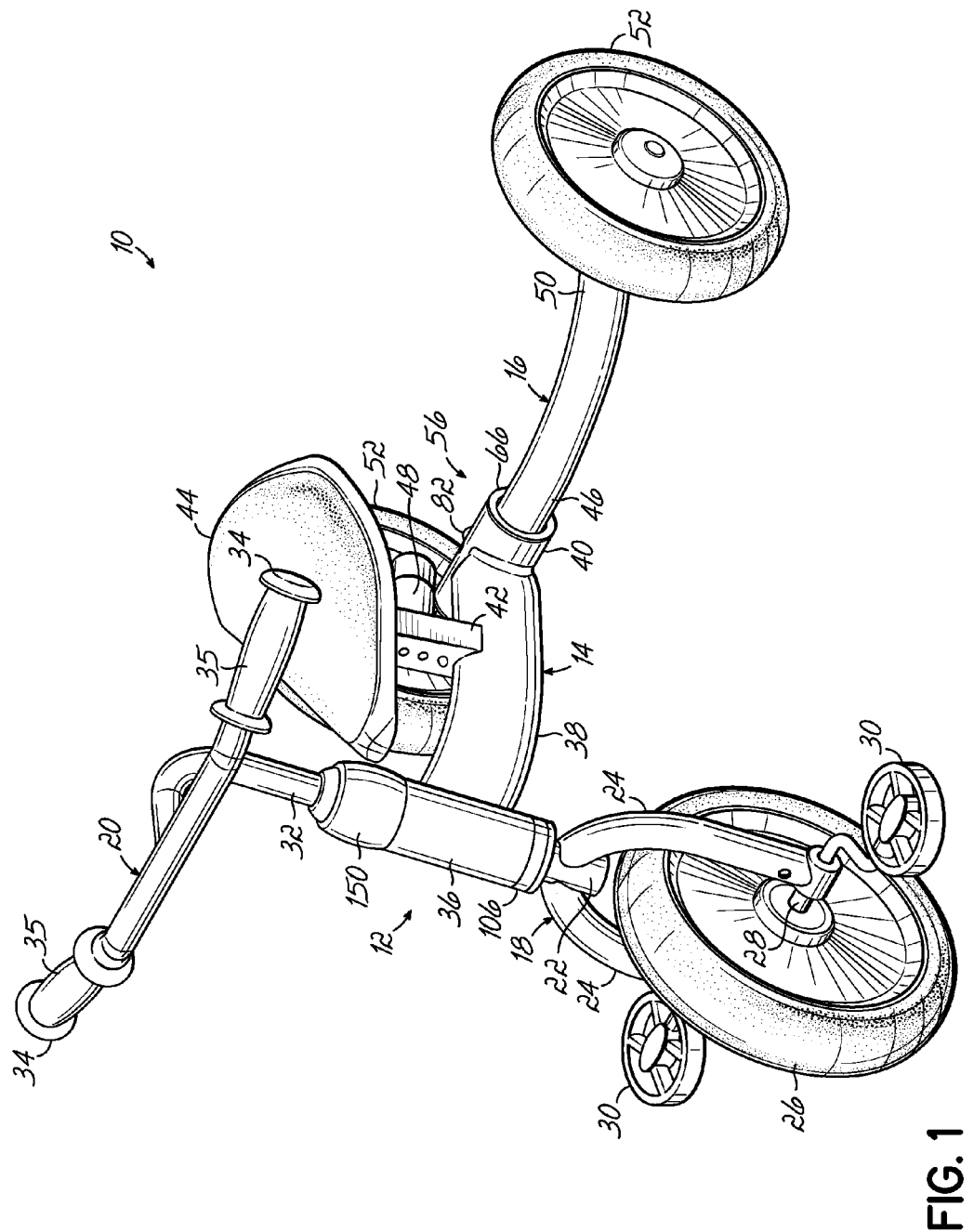
FIG. 1 is a front perspective view of a tricycle in accordance with an exemplary embodiment of the invention.
Figure 2:
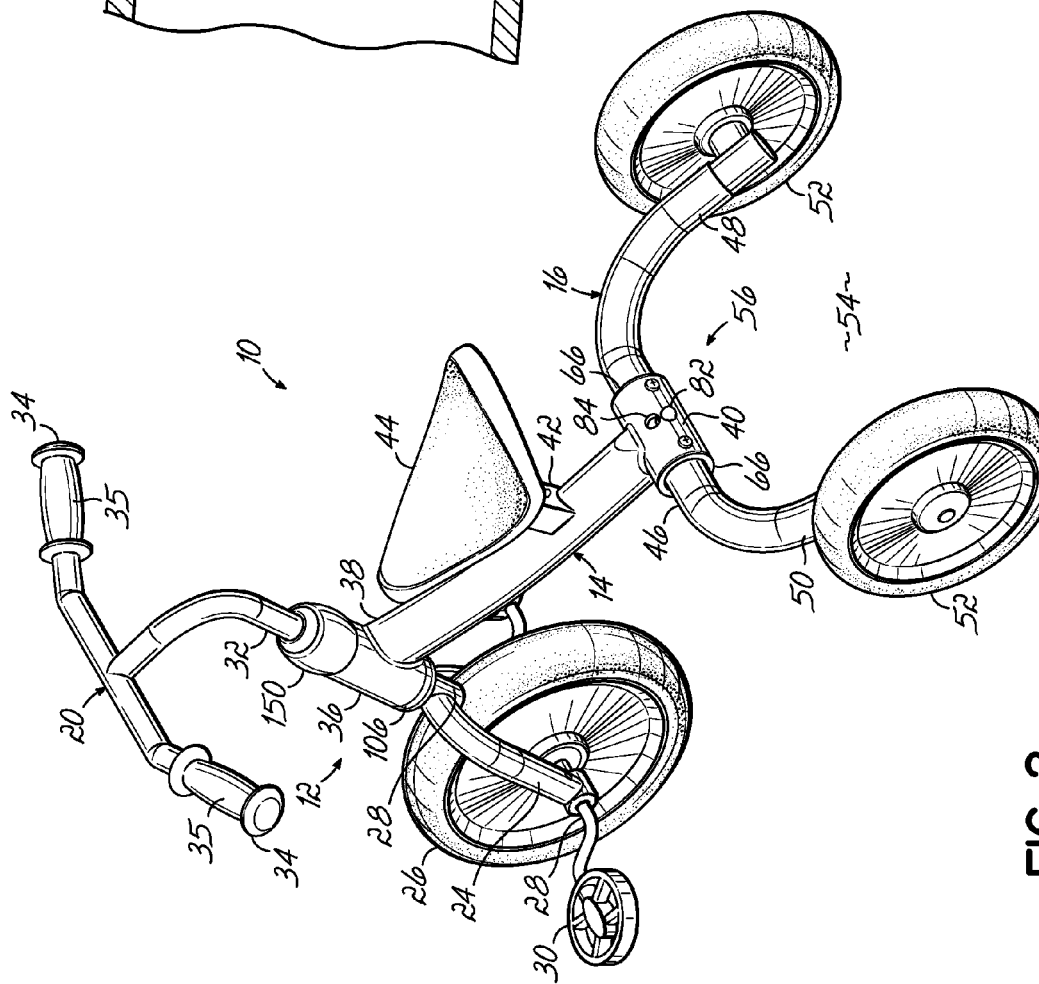
FIG. 2 is a rear perspective view of the tricycle shown in FIG. 1.

Referring now to the drawings and to FIGS. 1 and 2 in particular, a vehicle 10 (more specifically, a tricycle 10) in accordance with an exemplary embodiment of the invention is shown. The tricycle 10 includes a front frame 12, a middle frame 14, and a rear frame 16. The front frame 12 includes a front fork 18 operatively coupled to a handlebar 20. The front fork 18 includes a fork stem 22 and a pair of spaced apart forks or legs 24 extending therefrom in a generally parallel fashion. A front wheel 26, which defines a front axle 28, is positioned between the legs 24 and rotatably coupled thereto so as to allow rotation of the front wheel 26 relative to the front frame 12. A pair of pedals 30 are positioned outboard of the legs 24 of front fork 18 and are operatively coupled to the front wheel 26 (e.g., such as by being coupled to the front axle 28) for allowing the rider to rotate the front wheel 26, and consequently, propel the tricycle 10 in a certain direction dictated by handlebar 20.

The handlebar 20 includes a handlebar stem 32 configured to be coupled to the fork stem 22 and a pair of handles 34 configured to be grasped by the rider for turning the tricycle 10 in a desired direction. The handles 34 may include grips 35 or other features that facilitate gripping by the user. Those of ordinary skill in the art will recognize that the handlebar 20 may have a wide variety of shapes and designs and the invention is not limited to the particular embodiment shown herein.

The middle frame 14 includes a head tube 36 configured to be coupled to the front frame 12, one or more frame support elements 38 (one shown in the illustrated embodiment), and a knuckle 40 configured to be coupled to rear frame 16. As discussed in more detail below, the front frame 12, and more particularly, at least one of the fork stem 22 and handlebar stem 32 is configured to be inserted through the head tube 36 and rotatably mounted thereto so as to allow the front frame 12 to rotate relative to the middle frame 14, and thereby change the direction of the tricycle 10 through the rotation of handlebar 20. As illustrated in FIGS. 1 and 2, the frame support element 38 includes a saddle receiver post 42 extending therefrom and configured to be coupled to a saddle 44 on which the rider of the tricycle 10 sits.

In the exemplary embodiment shown in FIGS. 1 and 2, the rear frame 16 includes a generally U-shaped member having a middle portion 46 and end portions 48, 50 on either side thereof. The middle portion 46 is configured to be coupled to the middle frame 14, as is explained in more detail below. Moreover, each end portion 48, 50 includes a rear wheel 52 rotatably coupled adjacent an end thereof so as to allow rotation of the rear wheels 52 relative to the rear frame 16. The particular U-shaped configuration of rear frame 16 defines an open region, illustrated at 54, generally between the two wheels 52 and openly accessible from the rear of the tricycle 10, as illustrated in FIG. 2.

Figure 5:
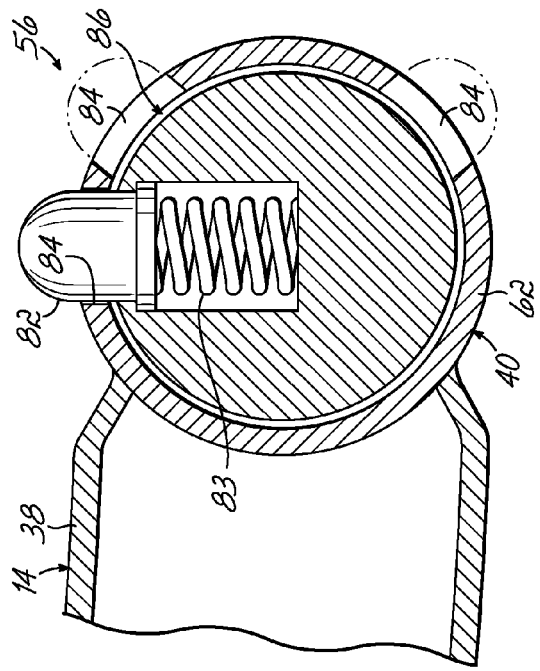
FIG. 5 is a cross-sectional view of a pivot joint taken along line 5-5 of FIG. 4.
Figure 3:
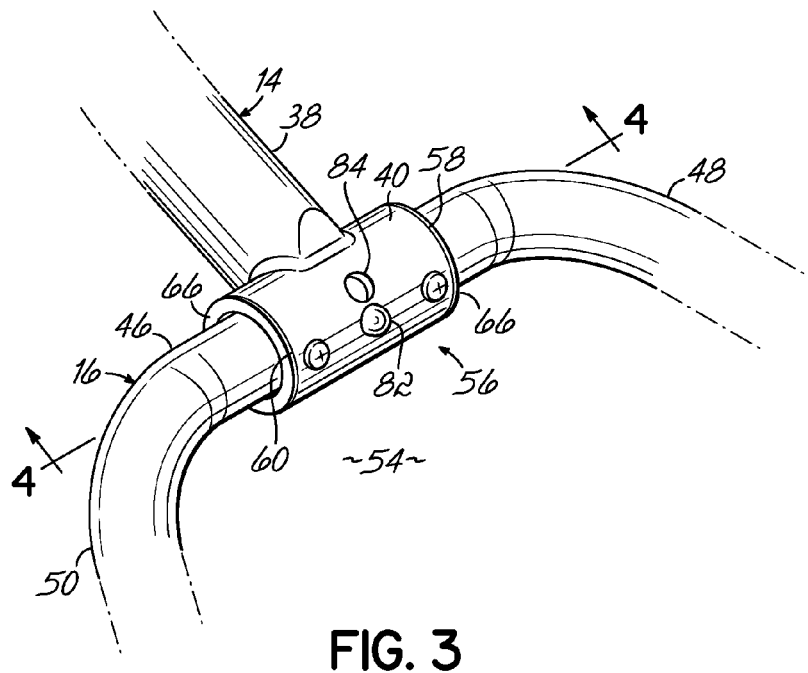
FIG. 3 is an enlarged perspective view of a pivot joint in accordance with an embodiment of the invention.
Figure 4:
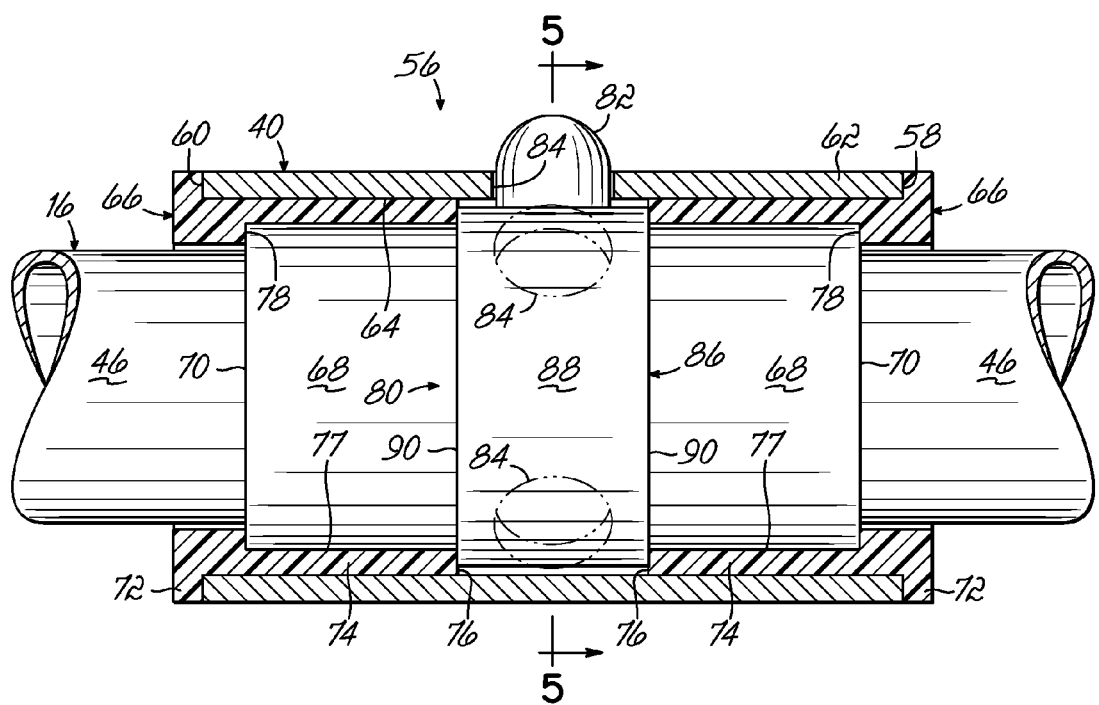
FIG. 4 is a partial cross-sectional view of the pivot joint shown in FIG. 3.

In one aspect of the exemplary embodiment, the coupling between the middle frame 14 and the rear frame 16 is configured as a swivel or pivot joint 56. As will be explained in more detail below, such a pivot joint 56 between the middle and rear frames 14, 16 allows the tricycle 10 to be convertible between multiple configurations. To this end, and as illustrated in FIGS. 3-5, the knuckle 40 has a generally tubular configuration defining open ends 58, 60 and a side wall 62 extending between ends 58, 60 that defines a passage 64 for receiving the middle portion 46 of rear frame 16 therein. In one embodiment, the passage 64 is generally circular in cross section and the middle portion 46 of rear frame 16 is likewise circular in cross section. However, the diameter of the middle portion 46 is less than the diameter of the passage 64 so that the rear frame 16 may rotate relative to the knuckle 40.

To facilitate coupling of the rear frame 16 to the knuckle 40, but yet allow relative rotation therebetween, the pivot joint 56 includes a pair of bushings 66 configured to be coupled to the open ends 58, 60 of knuckle 40, and a collar 68 fixedly coupled to the middle portion 46 of rear frame 16, and specifically along a portion thereof disposed within the passage 64 of knuckle 40. The bushings 66 and the collar 68 cooperate in a manner that substantially prohibits longitudinal and lateral movement (i.e., linear type movements) between the middle and rear frames 14, 16, but permits rotational movement therebetween.

To this end, the collar 68 includes an outer diameter greater than the outer diameter of the middle portion 46 of the rear frame 16 so as to define a shoulder 70 at the juncture between the collar 68 and the middle portion 46. Each of the bushings 66 includes an outer flange 72 that covers or caps the open ends 58, 60 of knuckle 40 and an annular extension portion 74 extending from the outer flange 72 and configured to be disposed within the passage 64 of knuckle 40 when coupled thereto. The bushings 66 are secured to the knuckle 40 through a friction fit. Alternatively, the bushings 66 may be coupled to knuckle 40 using connecting members as is generally known in the art.

The annular extension portion 74 includes an end face 76 and an interior bore 77 defining an internal shoulder 78 disposed between the end face 76 and the flange 72. The interior bore 77 extends through both the outer flange 72 and annular extension portion 74. The interior bore 77 is sized to receive a portion of the collar 68 and the middle portion 46 of rear frame 16 therethrough. When the bushings 66 are coupled to the knuckle 40, the internal shoulder 78 is adjacent to or abuts the shoulder 70 defined by collar 68. In this way, the interaction of shoulders 70, 78 effectively prevents lateral movement (as opposed to rotational movement) of the rear frame 16 relative to middle frame 14. As shown in FIG. 4, the annular extension portion 74 substantially fills an annular space between the side wall 62 of the knuckle 40 and the middle portion 46 of the rear frame 16.

The pivot joint 56 further includes a locking mechanism, generally shown at 80, adapted to fix the middle and rear frames 14, 16 in certain desirable configurations, as will be explained in more detail below. The locking mechanism 80 generally includes a movable projection associated with one of the rear frame 16 or the middle frame 14, and one or more apertures or openings associated with the other of the rear frame 16 or middle frame 14. The movable projection is configured to engage one of the openings to secure the middle and rear frames 14, 16 in a certain configuration. In the exemplary embodiment shown in FIGS. 3-5, the middle portion 46 of the rear frame 16 includes at least one spring-loaded push button 82 biased outwardly from the hub 62 by an internal spring member 83, and the side wall 62 of knuckle 40 includes a plurality of openings 84 configured to receive the push button 82 therein so as to secure the rear frame 16 relative to the middle frame 14. In this regard, a ring-shaped hub 86 is fixedly secured to the collar 68 on the middle portion 46 of the rear frame 16. The hub 86 is configured to support the one or more push buttons 82 of the locking mechanism 80 on a radially-facing side wall 88 thereof. The hub 86 is centrally disposed within the passage 64 of the knuckle 40 such that the end faces 76 of bushings 66 are adjacent or abut side surfaces 90 of hub 86. Such a configuration may further limit the ability of the rear frame 16 to move laterally relative to the middle frame 14.

Figure 6:
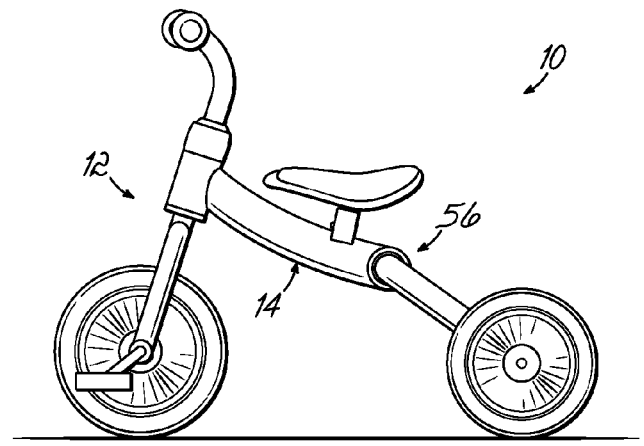
FIG. 6 is a side elevation view of the tricycle of FIG. 1 in a high rider configuration.
Figure 7:
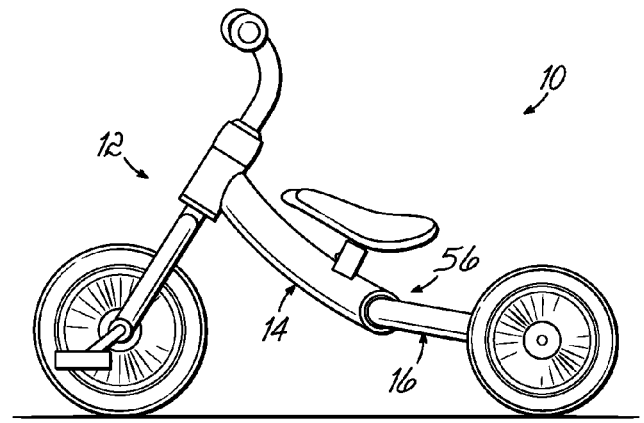
FIG. 7 is a side elevation view of the tricycle of FIG. 1 in low rider configuration.
Figure 8:
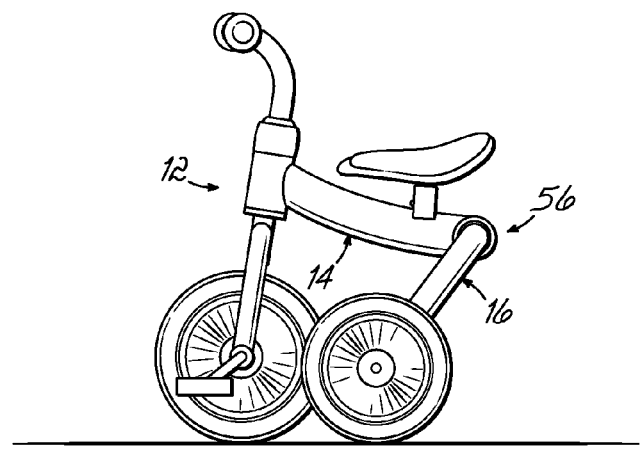
FIG. 8 is a side elevation view of the tricycle of FIG. 1 in a storage configuration.

The openings 84 are centrally disposed on the side wall 62 of knuckle 40 so as to substantially align with the push button 82. Moreover, the openings 84 are circumferentially spaced along side wall 62 such that when the push button 82 engages one of the openings 84, the tricycle 10 has a desired configuration. For example, one of the openings may be positioned such that when the push button 82 engages the opening, the tricycle 10 has a high rider configuration (FIG. 6). Another of the openings 84 may be positioned such that when the push button 82 engages this opening, the tricycle 10 has a low rider configuration (FIG. 7). Still further, another opening 84 may be positioned, such that when the push button 82 engages this particular opening, the tricycle 10 has a storage configuration (FIG. 8). In the storage configuration, the rear wheels 52 are essentially tucked underneath the middle frame 14 so that the tricycle 10 is more compact for storage. Those of ordinary skill in the art will recognize that other openings 84 may be included depending on the specific application.

To move between the various configurations, a user pushes the push button 82 inward until the tip thereof is radially inward of the opening 84 in knuckle 40. At this point, the middle and rear frames 14, 16 may be rotated relative to each other. During the rotation, the tip of the push button 82 engages the inner surface of the side wall 62 of knuckle 40 due to the bias of the spring member 83. When an opening 84 is encountered in the side wall 62, the spring member 83 biases the push button 82 to snap radially outward through the opening 84 to secure the middle and rear frames 14, 16 relative to each other in a rotational direction. In the exemplary embodiment, the rear frame 16 may be rotated relative to the middle frame 14 for a full 360°. Thus, a wide range of operative and storage positions may be defined by pivot joint 56. Such a locking mechanism 80 on the pivot joint 56 allows the tricycle 10 to be converted between various desired positions in a quick, reliable, and easy manner. Moreover, the pivot joint/locking mechanism discussed above is believed to overcome many of the shortcomings of pivot mechanisms used in existing convertible tricycles. By way of example, the design is relatively low cost, relatively simple and minimizes or eliminates sharp edges and potential pinch points.

The tricycle 10 includes additional features meant to address some of the shortcomings of existing tricycle designs. In this regard, tricycle 10 may include features that not only resist excessive rotations of handlebar 20, but also biases the handlebar 20 toward a preferred direction. While the preferred direction may be selected based on the particular application, in an exemplary embodiment, it is desirable to have the handlebar 20 (and thus front wheel 26) biased to a straight or forward direction.

As previously discussed, the front frame 12 couples to the middle frame 14 via the head tube 36. In the exemplary embodiment shown in FIGS. 9-11, the head tube 36 includes a generally hollow cylindrical body having upper and lower open ends 100, 102, respectively, and through which at least a portion of the front frame 12 may be disposed. In this regard, to support the front frame 12 within the head tube 36, the head tube 36 includes an upper head tube spacer 104 coupled to the upper end 100 of head tube 36, and a lower head tube spacer 106 coupled to the lower end 102 of head tube 36. The upper and lower head tube spacers 104, 106 are fixedly secured to the head tube 36 and configured to support the front frame 12 within head tube 36, yet allow rotation of the front frame 12 relative to the head tube 36 and middle frame 14. To this end, the upper and lower head tube spacers 104, 106 include respective apertures 107, 108 configured to receive the fork stem 22 and/or handlebar stem 32 therethrough. As shown in these figures, the fork stem 22 may be configured to be inserted through the head tube 36 and coupled to the handlebar stem 32 above the upper head tube spacer 104. As explained in more detail below, the coupling between the fork stem 22 and handlebar stem 32 may be achieved via a push button connection. Those of ordinary skill in the art will recognize, however, that the handlebar stem 32 may be disposed through the head tube 36 for connection to the fork stem 22 below the upper head tube spacer 104. Those of ordinary skill in the art will further recognize that the fork stem 22 and handlebar stem 32 may be coupled in other ways within the scope of the present invention.

Figure 9:
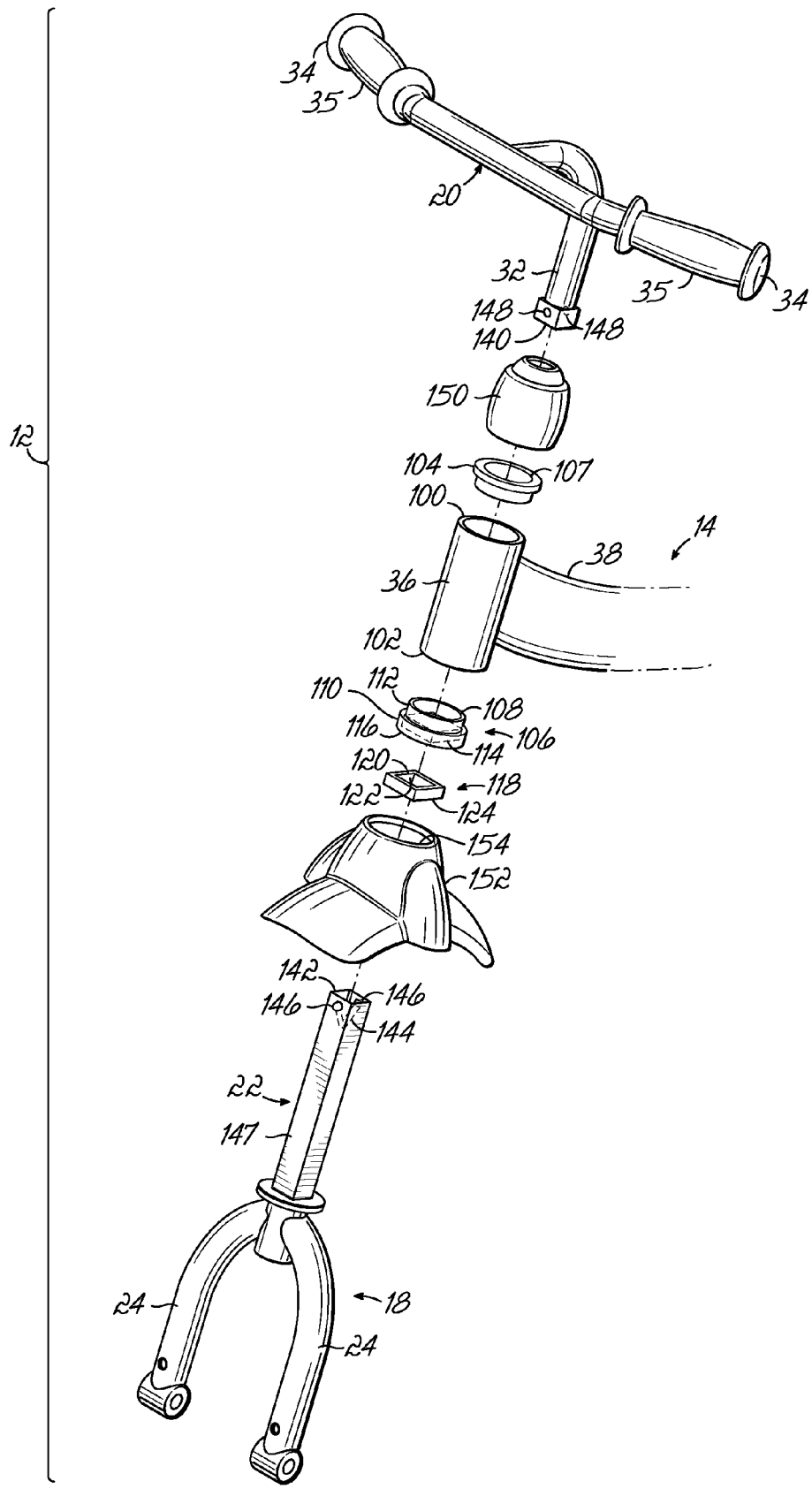
FIG. 9 is a disassembled perspective view of a front frame construction of the tricycle of FIG. 1.
Figure 10:
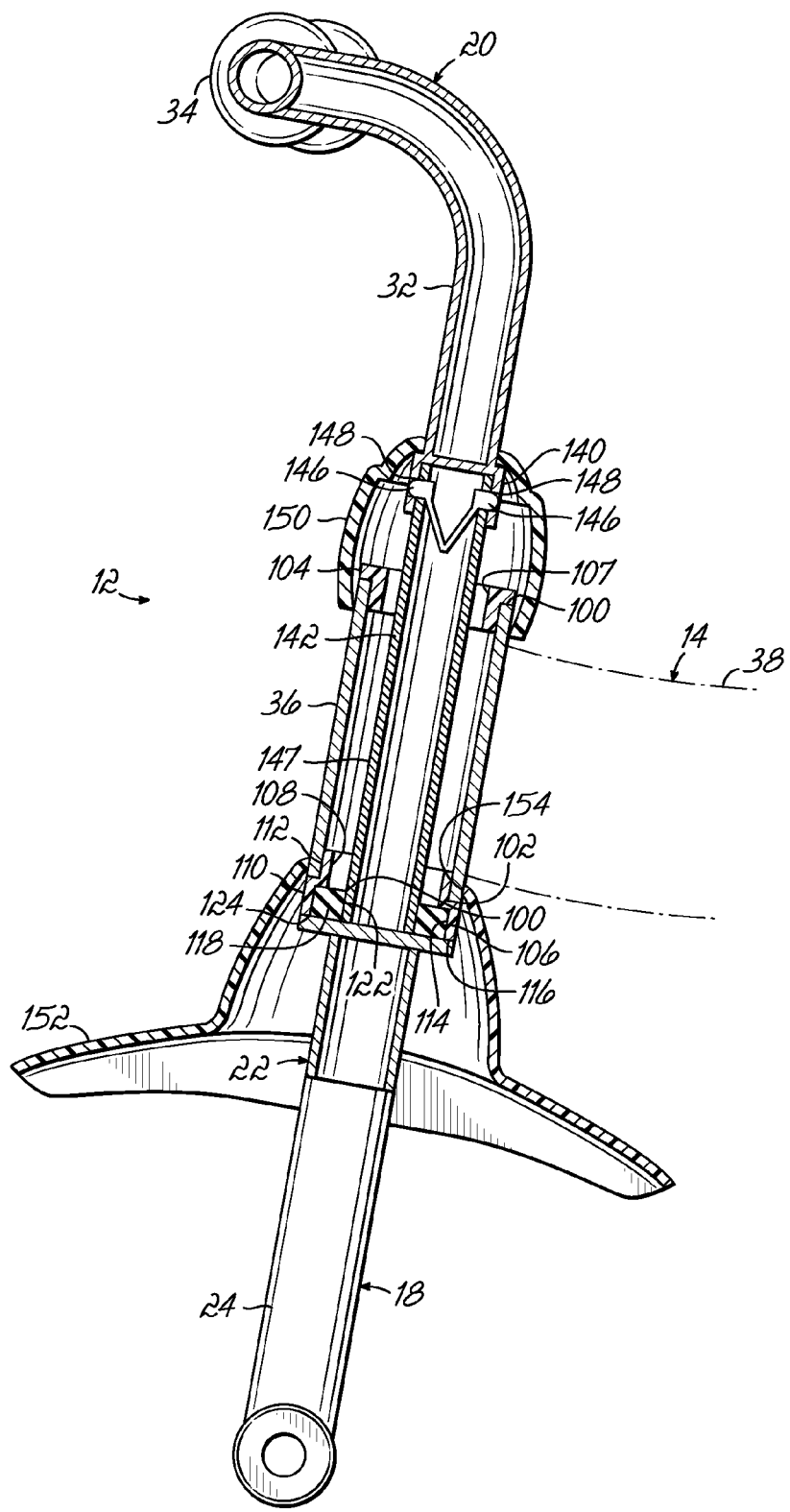
FIG. 10 is a partial cross-sectional view of the front frame construction of FIG. 9.
Figure 11:
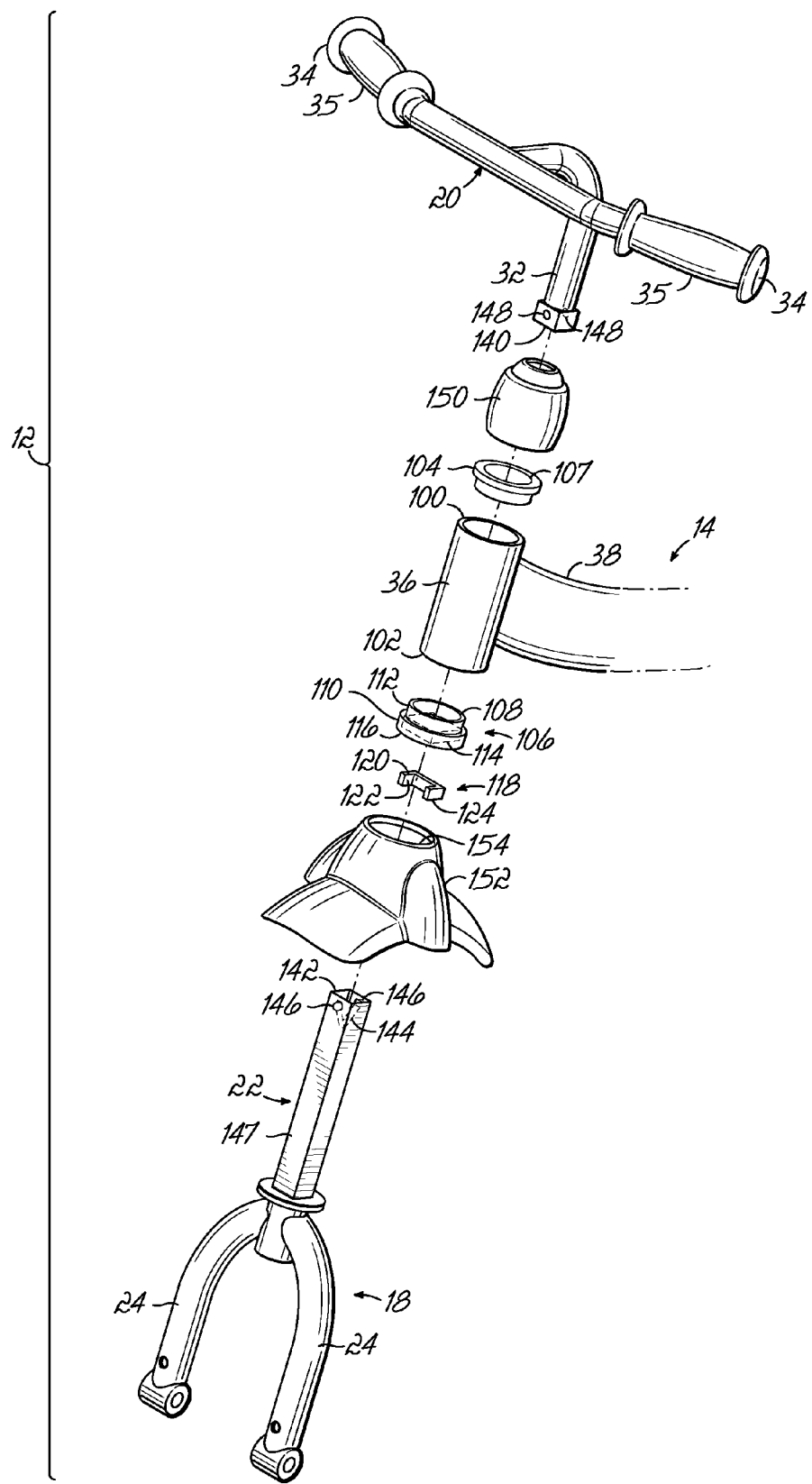
FIG. 11 is a disassembled perspective view of an alternative front frame construction of the tricycle of FIG. 1.

In accordance with the exemplary embodiment, biasing the handlebar 20 in the forward direction may be achieved using a resilient member that interacts with the head tube 36 and the front frame 12. In FIGS. 9-11, the lower head tube spacer 106 includes lower flange 110 adapted to be adjacent or abut the lower end 102 of the head tube 36, and an annular extension portion 112 extending from the lower flange 110 and configured to be disposed within the head tube 36. The lower head tube spacer 106 includes a cavity 114 open to a lower end face 116 of the lower head tube spacer 106 and generally disposed about the aperture 108 extending through the lower head tube spacer 106 (e.g., the aperture 108 and cavity 114 intersect). The cavity 114 is configured to receive a resilient gasket 118 that cooperates with the cavity 114 to bias the handlebar 20 in the forward direction.

In this regard, the gasket 118 may be formed from rubber or other suitable resilient material that includes an inner periphery 120, defined by a central aperture 122, and an outer periphery 124. The inner periphery 120 defines a shape that corresponds to the shape of the fork stem 22, which is tightly received in aperture 122. More particularly, the shape of the fork stem 22 and the inner periphery 120 are selected such that the gasket 118 rotates with rotation of the fork stem 22. Thus, the shape of the inner periphery 120 and fork stem 22 is preferably non-circular and may, for example, be polygonal. By way of example, and without limitation, the shape of the inner periphery 120 and fork stem 22 may be square, rectangular, triangular, pentagonal, octagonal, etc. in cross section. Other shapes, however, may also be used so long as rotation of the fork stem 22 causes a corresponding rotation in the gasket 118.

The outer periphery 124 of resilient gasket 118 includes a shape that at least partially corresponds to the shape of the cavity 114 in the lower head tube spacer 106. More particularly, the shape of the outer periphery 124 and the cavity 114 are selected such that the cavity 114 interacts with the gasket 118 to resist rotation of the front frame 12 relative to the head tube 36. Thus, the shape of the outer periphery 124 and the cavity 114 is preferably non-circular and may, for example, be polygonal. By way of example, and without limitation, the shape of the outer periphery 124 and cavity 114 may be square, rectangular, triangular, pentagonal, octagonal, etc. Other shapes may also be used so long as the interaction between the gasket 118 and the cavity 114 resists rotation of the fork stem 22. In one embodiment, the gasket 118 may be sized to fit snugly within the cavity 114. In an alternative embodiment, however, there may be some play between the gasket 118 and the cavity 114 (e.g., a slight gap therebetween). Additionally, the resilient gasket 118 may only correspond in shape with a portion of the cavity 114 as shown in FIG. 11.

In use, when the handlebar 20 is in the straight direction, the gasket 118 is in its default or uncompressed state within the cavity 114 such that there is substantially no net force imposed on the front frame 12 by gasket 118. As the handlebar 20 is turned (in either direction), the outer walls of the gasket 118 engage the inner walls of the cavity 114. As the gasket 118 is resilient, upon application of a sufficient force or torque, the gasket 118 begins to elastically deform so as to permit handlebar 20 to turn. As the handlebar 20 is turned further, the gasket 118 becomes more compressed. As the gasket 118 becomes more compressed, however, it takes a larger force (torque) to continue turning the handlebar 20. Thus, not only does the cavity/gasket interaction bias the handlebar 20 in the forward direction, but the cavity/gasket interaction also resists excessive rotations of the handlebar 20. Such a feature may reduce the likelihood that a child will turn the handlebar 20 too sharply and cause the tricycle 10 to overturn.

When the rider releases or sufficiently reduces his/her force (torque) on the handlebar 20, the handlebar 20 will automatically rotate back toward the straight direction. In this regard, the compression of the gasket 118 generates a biasing force (torque) in the direction opposite to the direction the handlebar 20 is being turned. Thus, if the handlebar 20 is being turned to the right, the compression of the gasket 118 results in a biasing force (torque) to the left. Similarly, if the handlebar 20 is being turned to the left, the compression of the gasket 118 results in a biasing force (torque) to the right. Thus, upon a release or sufficient reduction in the force (torque) the rider imposes on the handlebar 20, the handlebar 20 will rotate toward the straight direction. This feature avoids the frustration that accompanies frequent steering corrections by parents or overseers of the rider.

It should be recognized that the gasket/cavity interaction is not a hard or fixed stop (e.g., metal-to-metal contact or plastic-to-plastic contact) as is used in many conventional steer limiting mechanisms to prevent handlebar rotations beyond a certain value. Instead, the gasket/cavity interaction, as described above, resists excessive turning of handlebar 20 by increasing the turning force (torque) as the turning angle increases. If a sufficiently large force (torque) is applied to handlebar 20, the gasket 118 will slip relative to the fork stem 22 and allow the handlebar to turn. For example, it is expected that an adult would be able to rotate the handlebar 20 a full 360°. In addition to the above, it should also be recognized that while the cavity 114 is shown in the lower head tube spacer 106, the cavity 114 (and gasket 118) may be disposed in the upper head tube spacer 104 or in the head tube 36 intermediate the upper and lower head tube spacers 104, 106.

Tricycle 10 includes another feature configured to facilitate assembly of the tricycle. As noted above, consumers often find home assembly of tricycles time consuming and frustrating. In this regard, it is believed that a relatively large percentage of product returns are a result of the inability of the consumer to properly assemble the tricycle. Such returns are not only costly and frustrating for retail stores, but are also costly to manufacturers. As is also discussed above, one of the issues that tend to be problematic involves properly orienting and aligning the various components of the tricycle during assembly.

Generally speaking, manufacturers of tricycles make the components from metal tubing having circular cross-sectional shapes. The coupling of components generally includes telescoping one tube inside of another and then securing them with a fastener or connecting member that prevents relative movement therebetween. Telescoping tubes having circular cross-sectional shapes, however, essentially have an infinite number of relative rotational positions that may make proper alignment of the nested tubes difficult. Additionally, the connecting members that couple the tubes must be configured to withstand the loads applied to the tubes (i.e., the connecting member takes the loads as opposed to the tubes themselves). The coupling between the handlebar and the front fork and the coupling between the saddle and the frame are two common examples where telescoping tubes are generally utilized to form a coupling between components.

To address this issue, tricycle 10 includes a number of features that simplify assembly. In this regard, tricycle 10 makes use of tubes having non-circular cross-sectional shapes such that relative rotation between the tubes when nested is prohibited by an interaction of the tubes themselves. The tubing may be, for example, polygonal and include, without limitation, square, rectangular, triangular, pentagonal, octagonal, etc., cross-sectional shapes. In contrast to circular cross-sectional shapes, non-circular cross-sectional shapes provide a finite number of relative positions between the two nested tubes (e.g., typically equal to the number of sides of the polygonal tubing). Accordingly, alignment of the various components during assembly is significantly improved. Additionally, the loads imposed on the tubes may now be carried by the tubes themselves as opposed to the connecting members that couple the tubing together. Consequently, the connecting members may be simplified and designed to provide enhanced coupling between the tubing (e.g., quick connections, adjustability, simplicity, etc.) as opposed to being primarily designed to withstand the loads imposed on the joint.

As shown in FIGS. 9-11, the coupling between the handlebar 20 and the front fork 18 of tricycle 10 makes use of non-circular geometries. In particular, the lower portion 140 of handlebar stem 32 has a generally square cross-sectional shape. Although a square cross-sectional shape is illustrated in the exemplary embodiment, those of ordinary skill in the art will recognize that other shapes, including those provided above, may also be used. Additionally, the upper portion 142 of fork stem 22 has a shape that corresponds to the shape of the handlebar stem 32, and thus in the exemplary embodiment, is generally square in cross-sectional shape. The size of the upper portion 142 of fork stem 22 may be slightly smaller than the size of the lower portion 140 of handlebar stem 32 so that the fork stem 22 is telescopingly received in handlebar stem 32. Those of ordinary skill in the art will recognize that alternatively, the handlebar stem 32 may be telescopingly received in the fork stem 22. Due to the non-circular cross-sectional shapes, rotation of handlebar 20 causes a corresponding rotation in the front fork 18 (and thus front wheel 26) without any further connecting element.

Nevertheless, the handlebar 20 and the front fork 18 may be coupled in a manner that prevents these elements from pulling apart from each other (e.g., such as along a generally longitudinal direction). However, because the load-bearing aspects relative to rotation of front frame 12 have been substantially accommodated by the geometry of the tubing, the connecting element may be designed for speed of connection, adjustability, simplicity, and possibly other purposes. In this regard, and as illustrated in FIGS. 9-11, a push button locking mechanism, generally shown at 144, may be implemented to couple the handlebar stem 32 and fork stem 22. More particularly, the fork stem 22 includes at least one, and preferably a pair of spring loaded push buttons 146 that extend from an outer surface 147 of the upper portion 142 of fork stem 22. Additionally, the lower portion 140 of handlebar stem 32 includes at least one, and preferably a pair of apertures 148 configured to receive the push buttons 146 therethrough to fix the handlebar stem 32 relative to the fork stem 22. Such a push button/aperture type of connection is quick and relatively easy for a consumer to implement. Additionally, the connection may be achieved without the use of any tools.

Those of ordinary skill in the art will recognize that in an alternative embodiment, the push buttons 146 may be associated with the handlebar stem 32 and the apertures 148 may be associated with the fork stem 22 depending on, for example, which tube is telescoped into the other tube. Additionally, and although not shown, the handlebar stem 32 may include multiple pairs of apertures 148 longitudinally spaced along the handlebar stem 32 to provide for adjusting the relative position of the handlebar stem 32 and fork stem 22. This would, for example, allow the handlebar 20 to be raised/lowered relative to middle frame 14 in a quick and easy manner.

To allow the consumer to make the connection or adjust the connection, the locking mechanism 144 should be accessible to the consumer. As noted above, in the exemplary embodiment, the connection between the handlebar stem 32 and the fork stem 22 may be located above the head tube 36. To protect the locking mechanism 144 from becoming accidentally or otherwise unintentionally disengaged, tricycle 10, and more particularly, front frame 12, may include a movable (e.g., slidable) protective boot 150. In this way, to assemble or adjust the locking mechanism 144, the boot 150 may be slid upwardly along the handlebar stem 32 to expose the locking mechanism 144 to the user assembling or adjusting the tricycle 10. However, after assembly or adjustment, the boot 150 may be moved downwardly to cover the locking mechanism 144. In the exemplary embodiment, the boot 150 is formed from a soft polyvinyl chloride (PVC). Those of ordinary skill in the art will recognize, however, that other suitable materials may also be used to form boot 150.

In addition to the benefits provided above, the non-circular geometry of the fork stem 22 and/or handlebar stem 32 may also be beneficial for coupling other components to the front frame 12. For example, the front frame 12 may include a front fender 152 with an aperture 154 having a shape corresponding to the shape of the fork stem 22 (e.g., square). Thus, aligning the front fender 152 is simplified and it may also be possible to forego the use of any connecting members to secure the front fender 152 to the front frame 12. It should be recognized that while the front fender 152 may be adjacent or abut the lower head tube spacer 106, the fender 152 does not interact with the cavity 114 in the lower head tube spacer 106 or the resilient gasket 118 disposed therein and therefore plays no role in resisting the turning of the handlebar 20 as discussed above.

Figure 12:
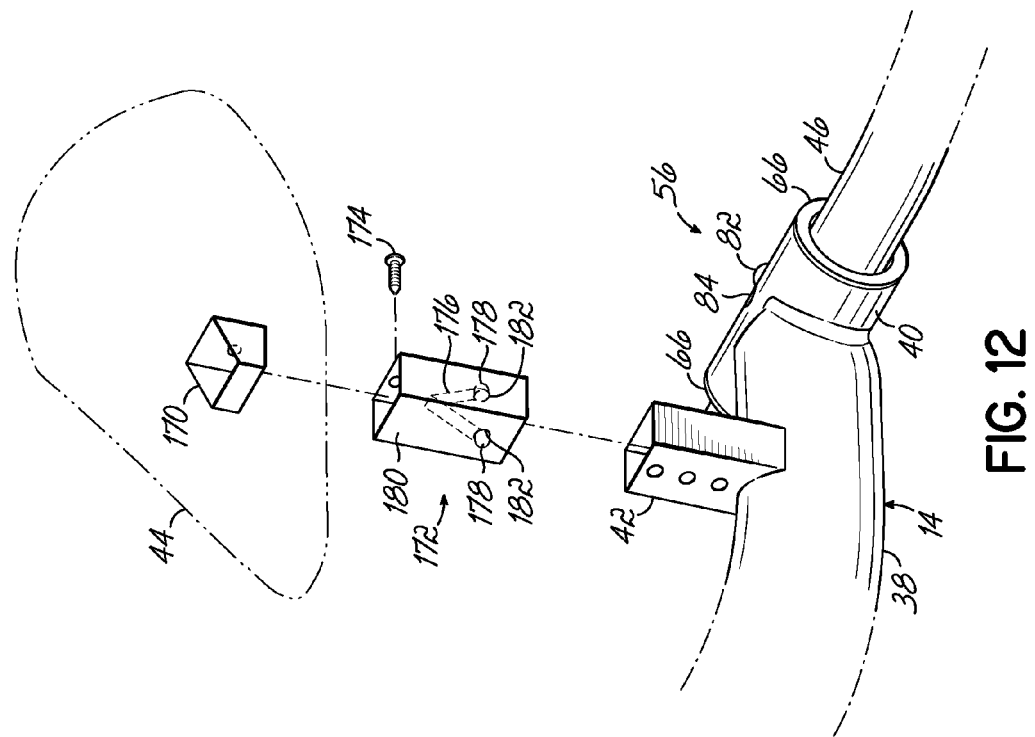
FIG. 12 is a perspective view of a saddle construction in accordance with an embodiment of the invention.

In addition to the coupling of the front fork 18 and the handlebar 20, non-circular tubing may also be beneficial to the coupling of the saddle 44 to the middle frame 14. As illustrated in FIG. 12, in the exemplary embodiment, the saddle receiver post 42 on middle frame 14 has a non-circular geometry and may, for example, be polygonal in cross section (square shown in drawings). By way of example and without limitation, the shape may be square, rectangular, triangular, pentagonal, octagonal, etc. in cross section. Other shapes, however, may also be used. Moreover, the saddle 44 includes a base post 170 extending from the saddle 44 and configured to mate with the saddle receiver post 42. Accordingly, the base post 170 has a cross-sectional shape corresponding to that of the saddle receiver post 42 (e.g., square). Intermediate the base post 170 and saddle receiver post 42 may be an adaptor 172 having a cross-sectional shape corresponding to that of the base post 170 and the saddle receiver post 42 (e.g., square). While in the exemplary embodiment the adaptor 172 is separate from the base post 170, in an alternative embodiment, the adaptor 172 may be integrally formed with the base post 170 (not shown). When the adaptor 172 is separate from the base post 170, a connecting element, such as screw 174, may be used to couple the two components together. Due to the non-circular cross-sectional shapes, saddle 44 is prevented from rotating relative to the middle frame 14 without any further connecting element.

The adaptor 172 is sized so as to be telescopingly received in the saddle receiver post 42. Similar to above, the non-circular cross-sectional shapes provide a finite number of relative rotational positions between the adaptor 172 and the saddle receiver post 42. Accordingly, alignment of the saddle 44 relative to the middle frame 14 during assembly is significantly improved. Additionally, the loads imposed on the tubes may now be carried by the tubes themselves as opposed to the connecting members that couple the tubing together. Consequently, the connecting members that couple the adaptor 172 and the saddle receiver post 42 may be simplified and designed to provide enhanced coupling (e.g., quick connections, adjustability, etc.) as opposed to being designed to withstand the loads imposed on the joint.

Though relative rotation between the saddle 44 and saddle receiver post 42 is prevented by the geometry of the tubes, these components may be coupled in a manner that prevents them from being pulled apart from each other (e.g., such as along a generally longitudinal direction). However, because the load-bearing aspects relative to rotation of saddle 44 have been substantially accommodated by the geometry of the tubing, the connecting element may be designed for speed of connection, adjustability, simplicity, and possibly other purposes. In this regard, and as illustrated in the figures, a push button locking mechanism, generally shown at 176, may be implemented to couple the adaptor 172 with the saddle receiver post 42. More particularly, the adaptor 172 includes at least one, and preferably a pair of spring-loaded push buttons 178 that extend from an outer surface 180 of adaptor 172. Additionally, the saddle receiver post 42 includes at least one, and preferably a pair of apertures 182 configured to receive the push buttons 178 therethrough to fix the adaptor 172 (and therefore the saddle 44) relative to the middle frame 14. Such a push button/aperture type of connection is quick and relatively easy for a consumer to implement. Additionally, the connection may be achieved without the use of any tools.

Those of ordinary skill in the art will recognize that in an alternative embodiment, saddle receiver post 42 may be telescopingly received in the adaptor 172. In such an embodiment, the push buttons 178 may be associated with the saddle receiver post 42 and the apertures 182 may be associated with the adaptor 172. Additionally, as shown in FIG. 12, the saddle receiver post 42 may include multiple pairs of apertures 182 axially spaced along the saddle receiver post 42 to provide for adjusting the relative position of the saddle 44 and middle frame 14. This would, for example, allow the saddle 44 to be raised/lowered relative to middle frame 14 in a quick and easy manner.

In view of the non-circular geometries and the push button type of locking mechanisms, as described above, it may be possible to assemble tricycle 10 in a substantially tool-less manner. Additionally, the tricycle 10 may be assembled in a relatively short amount of time (e.g., such as within just a couple of minutes). In this way, many of the frustrations associated with home assembly have been overcome. Accordingly, it is expected that the costs and frustrations associated with product returns will dramatically decrease in view of one or more of the features disclosed herein.

Figure 13:
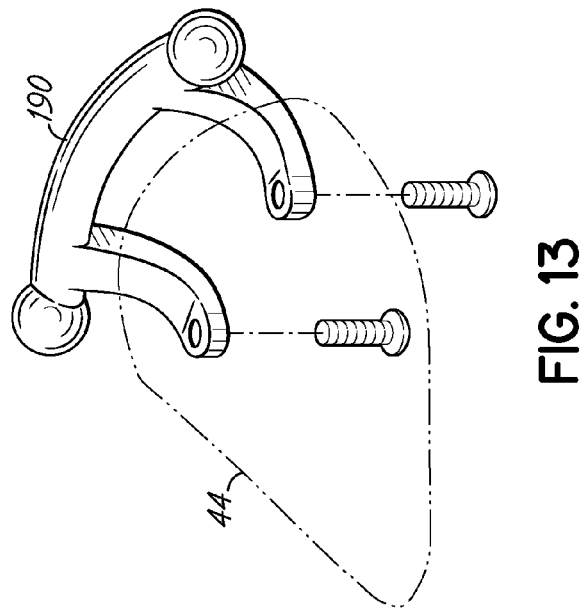
FIG. 13 is a perspective view of an alternative embodiment of a saddle for connection with the tricycle of FIG. 1.

In addition to the above, the unique U-shaped design of the rear frame 16 may allow for new uses of tricycle 10 that have heretofore not been fully appreciated by the industry. In this regard, and as noted above, the rear frame 16 defines an open region 54 between the rear wheels 52 that is open or accessible from the rear of the tricycle 10. In one exemplary embodiment, the tricycle 10 may be used as a walking trainer for infants and toddlers. To this end, the open region 54 provides a space for the child to occupy. The rear frame 16 provides a support structure that helps support the child without encumbering the ability of the child to take steps. As illustrated in the earlier figures, the open region 54 is adjacent the saddle 44. For this new application, and as shown in FIG. 13, the saddle 44 includes a handle 190 coupled thereto and configured to be grasped by the child when the tricycle 10 is in the high rider configuration. As the child walks, the tricycle 10 moves forward (assuming the handlebar 20 is pointed in the forward direction). Thus, the child is able to be supported by the tricycle 10 but yet move the tricycle as he/she walks.

This particular use of the tricycle 10 may be enhanced when used in combination with the steer straight technology described above. For example, it is desirable for the tricycle 10 to move in the straight or forward direction as the child pushes the tricycle. Since there may be no rider on the tricycle 10 when being used as a walking trainer, the resilient gasket 118 maintains the handlebar 20 in the forward direction. Thus, the direction of the tricycle 10 becomes ideal and predictable when being used as a walking trainer.

Some manufacturers provide additional features to the tricycle. These features may be provided in a separate product, such as by providing a lower end model tricycle and an upper end model tricycle, wherein the upper end model tricycle includes such additional features. These features may also be provided as separate add-on products. By way of example, such features may include a push handle for allowing a parent or overseer to push a child on the tricycle, a canopy for providing shade to the child riding the tricycle, and/or foot rests for providing a location to place the child's feet in the event the child is too small to reach the pedals. Those of ordinary skill in the art may recognize other features as well. In any event, these additional features may be configured to take advantage of the non-circular tube geometries so as to facilitate their use or coupling to the tricycle.

Figure 14:
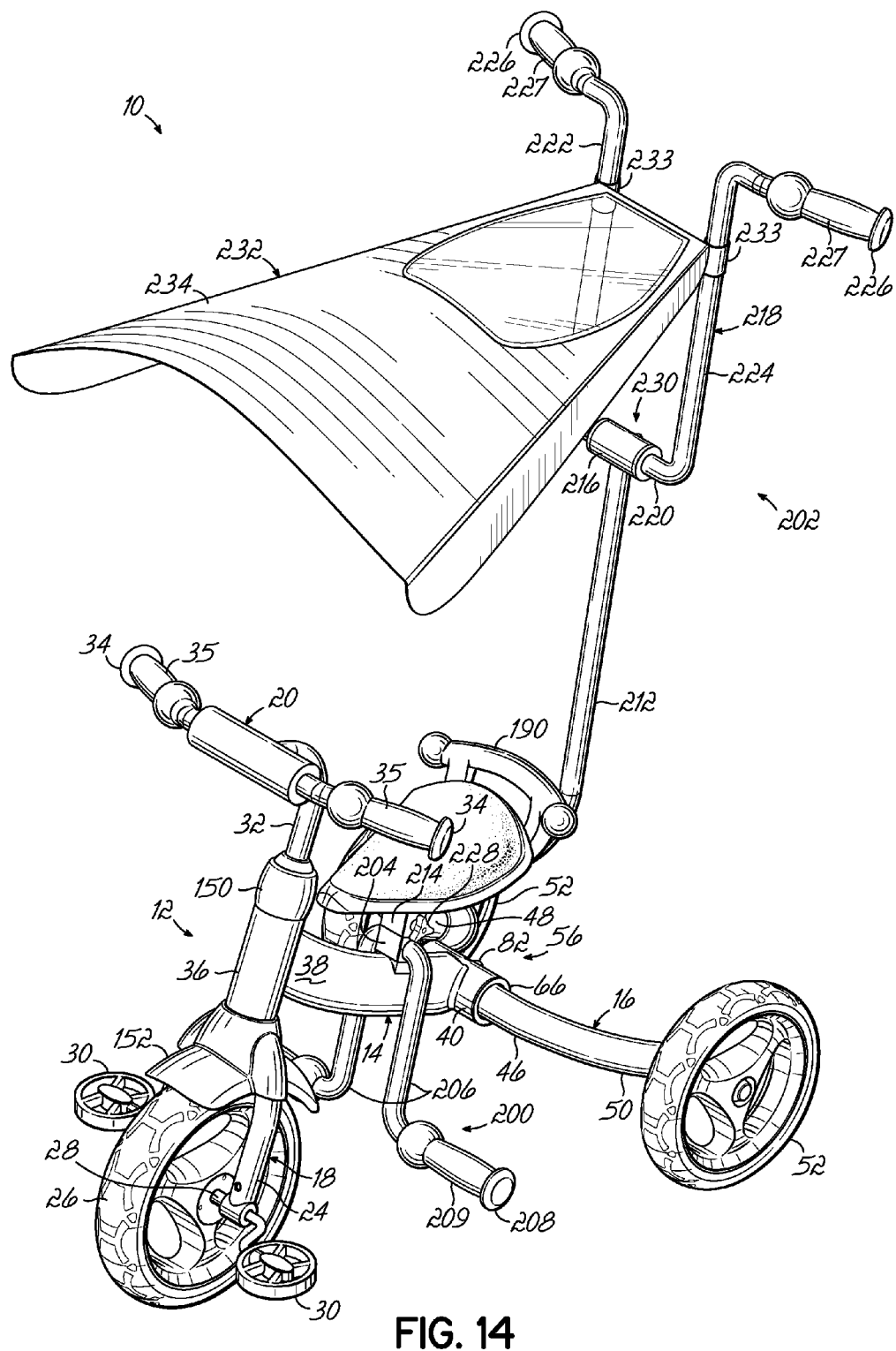
FIG. 14 is a front perspective view of a tricycle with additional features, including a foot rest assembly and a push handle assembly.
Figure 15:
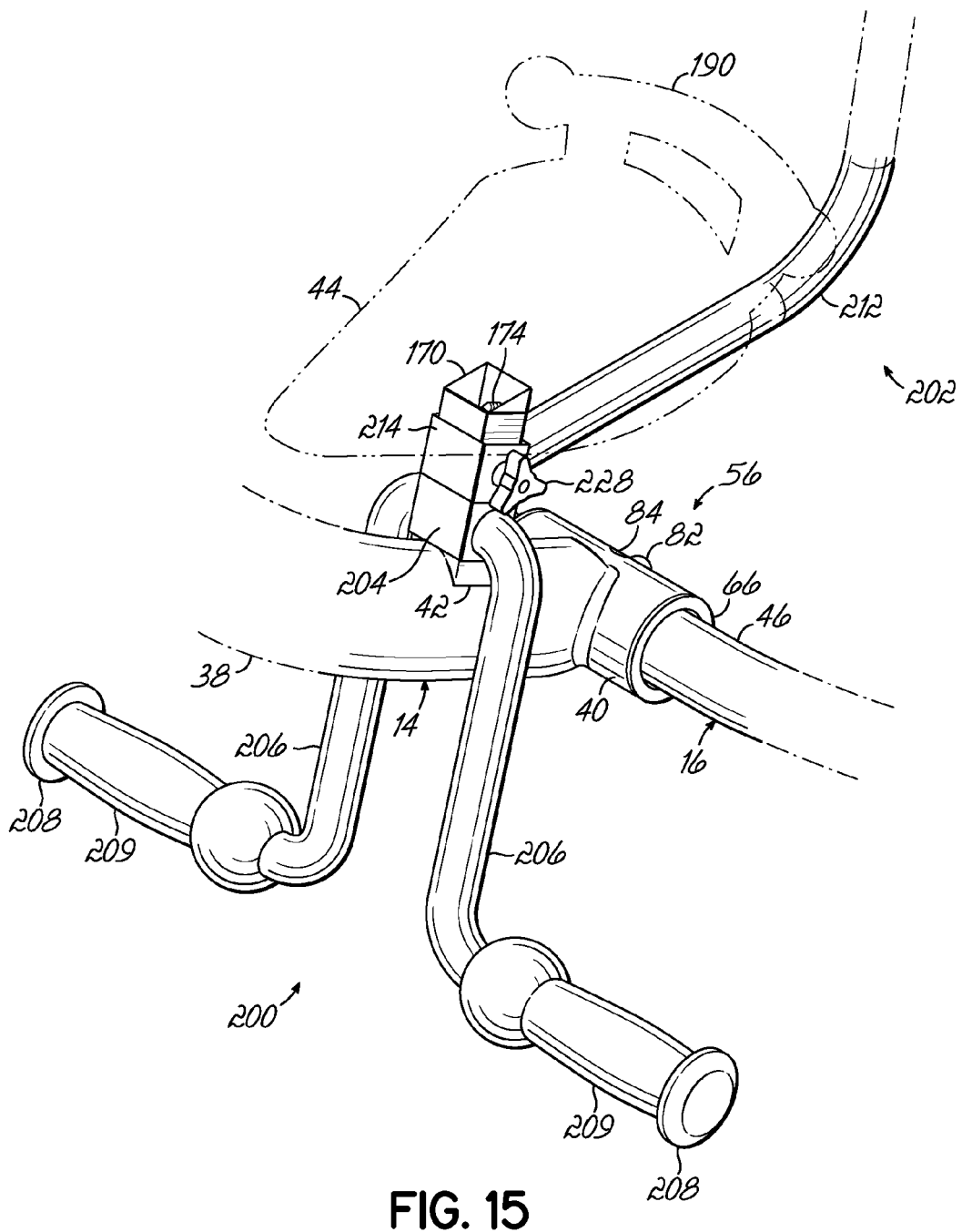
FIG. 15 is a front perspective view of the foot rest assembly of FIG. 14.
Figure 16:
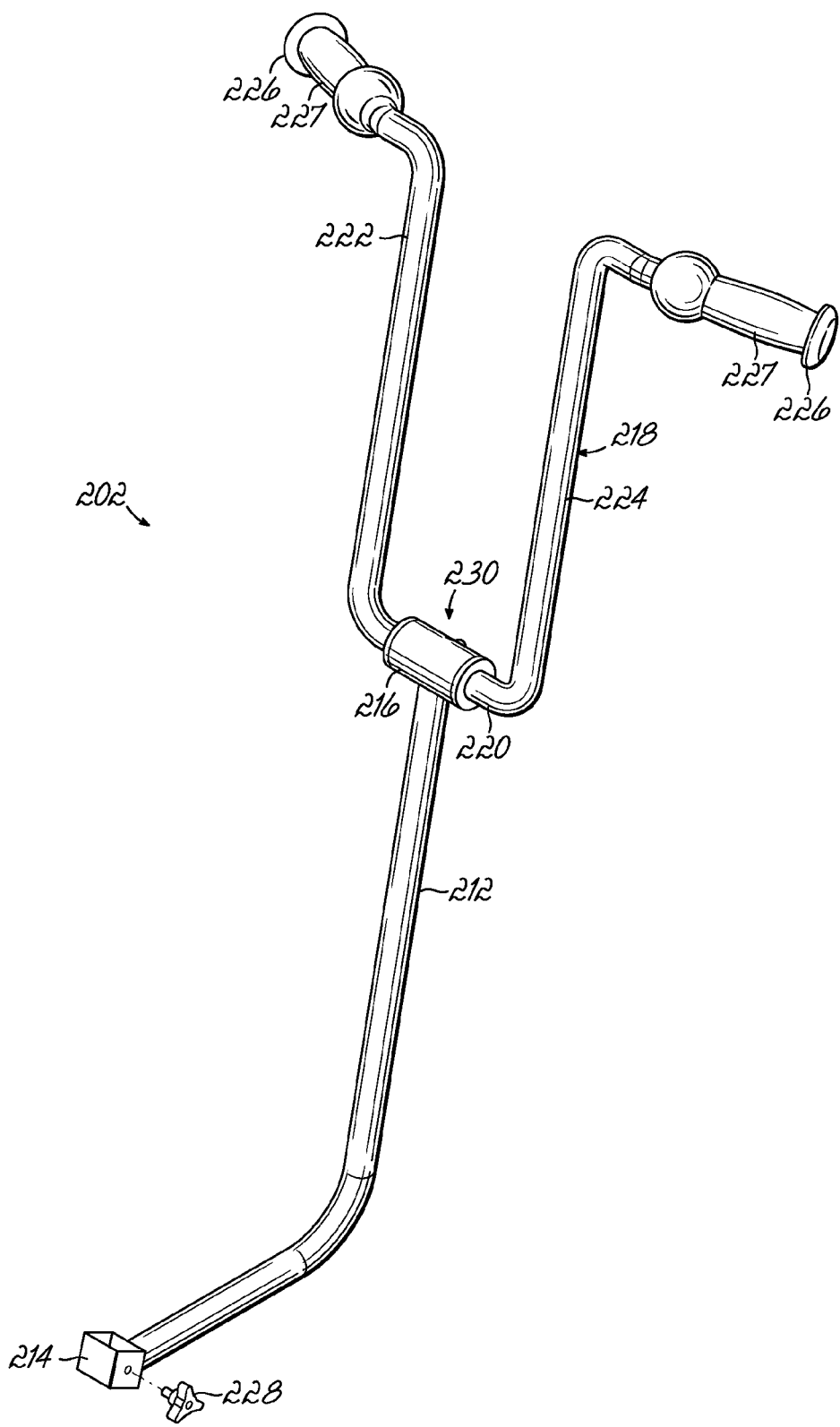
FIG. 16 is a front perspective view of the push handle assembly of FIG. 14.
Figure 17:
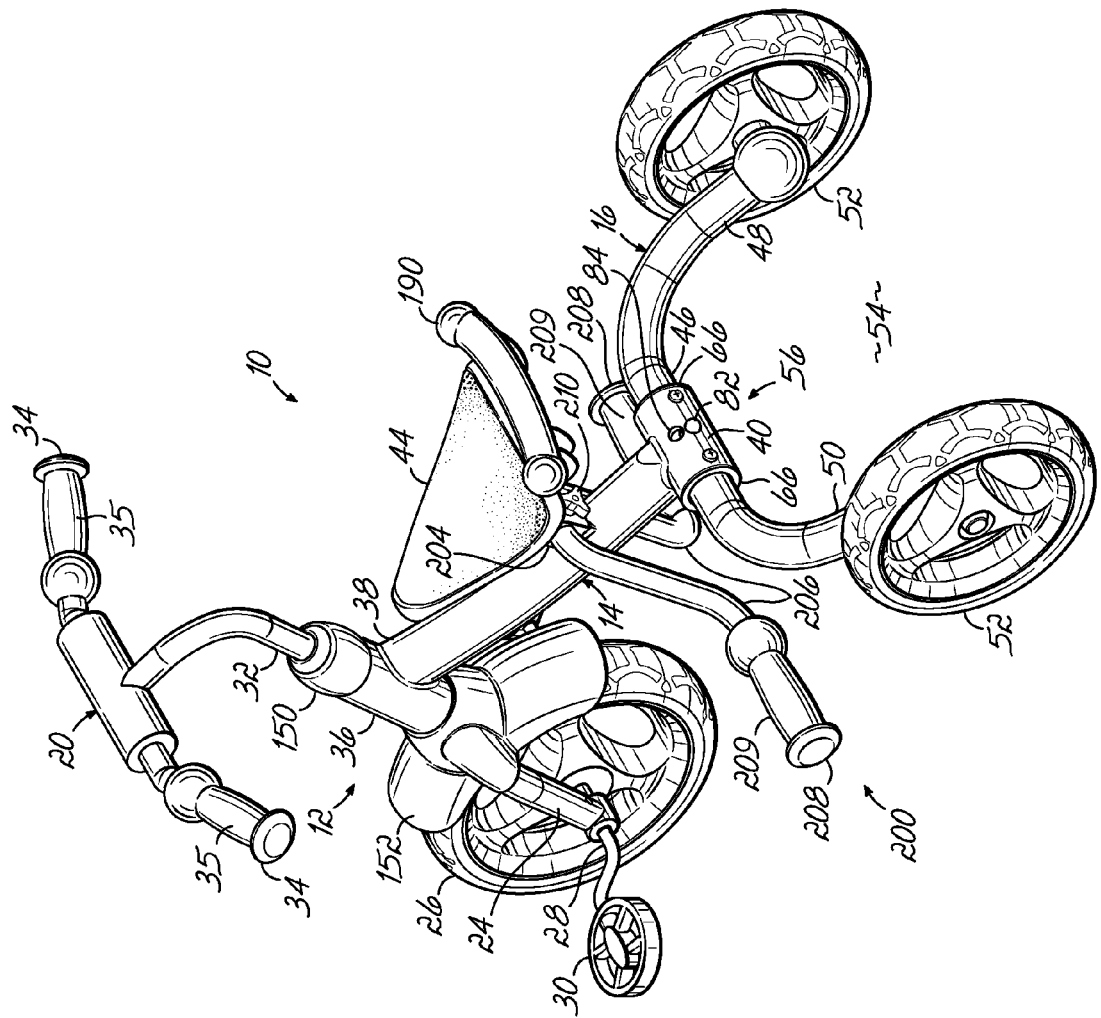
FIG. 17 is a rear perspective view of the tricycle with additional features of FIG. 14.

In this regard, and in reference to an alternative embodiment shown in FIGS. 14-17, the tricycle 10 has a foot rest assembly 200 and a push handle assembly 202 that couple to the tricycle 10. While a separate connecting structure may be provided for coupling these assemblies 200, 202 to the tricycle 10, in the illustrated embodiment, the existing saddle receiver post 42 is utilized to couple these assemblies 200, 202 to the tricycle 10. As shown in FIGS. 14, 15, and 17, the foot rest assembly 200 includes a tubular coupling body 204 configured to be slidably and removably mounted over the saddle receiver post 42 prior to placement of the saddle 44 on the saddle receiver post 42. The tubular coupling body 204 has a cross section that substantially corresponds to the cross section of the saddle receiver post 42. Thus, in the illustrated embodiment, the tubular coupling body 204 has a non-circular geometry and may, for example, be polygonal in cross section (square in the figures). By way of example and without limitation, the shape may be square, rectangular, triangular, pentagonal, hexagonal, octagonal, etc. in cross section. Other shapes, however, may also be used. A pair of legs 206 are coupled to the tubular coupling body 204 at a first end thereof and extend in a generally downwardly direction. When mounted to the saddle receiver post 42, the legs 206 are on either side of the middle frame 14 and located generally below the saddle 44. Foot pegs 208 are coupled to the legs 206 at a second end thereof and extend outwardly from the middle frame 14 (e.g., in a generally perpendicular manner). The foot pegs 208 are configured to receive and support the feet of the rider of tricycle 10. Foot grips 209 may also be provided to facilitate engagement between the rider's feet and the foot rest assembly 200.

Due to the non-circular cross-sectional shapes, foot rest assembly 200 is prevented from rotating relative to the middle frame 14 without any further connecting element. Additionally, the non-circular cross-sectional shapes provide a finite number of relative rotational positions between the foot rest assembly 200 and middle frame 14. Accordingly, alignment of the foot rest assembly 200 with middle frame 14, and more particularly saddle receiver post 42, during assembly is significantly improved. Furthermore, the loads imposed on the tubes may now be carried by the tubes themselves.

Though relative rotation between the foot rest assembly 200 and the saddle receiver post 42 is prevented by the geometry of the tubes, these components may be secured in a manner that prevents them from moving apart from each other (such as along the longitudinal axis of the seat post receiver 42). For example, such a securement would prevent the foot rest assembly 200 from undesirably moving (such as when the tricycle hits a bump) or vibrating during use. In this regard, the foot rest assembly 200 may include a threaded fastener for securing the foot rest assembly 200 with the saddle receiver post 42. In the illustrated embodiment, the tubular coupling body 204 may include a threaded bore configured to receive a threaded pin having a turn knob 210 that is received therethrough. As those of ordinary skill in the art will appreciate, the knob 210 may be turned to tighten or loosen the connection between the foot rest assembly 200 and the saddle receiver post 42. The connection between the foot rest assembly 200 and saddle receiver post 42 may be achieved without the use of any tools.

Tricycle 10 may further include a push handle assembly 202 to allow a parent or other adult to push the tricycle 10 from behind. As shown in FIGS. 14, 16, and 17, the push handle assembly 202 includes an elongated, generally J-shaped member 212 having a tubular coupling body 214 on a first end thereof and a knuckle 216 at a second end thereof. The tubular coupling body 214 is configured to be slidably and removably mounted over the saddle receiver post 42. For example, if used with foot rest assembly 200, the tubular coupling body 214 may abut and be positioned above tubular coupling body 204 (e.g., see FIGS. 14 and 15). The tubular coupling body 214 has a cross section that substantially corresponds to the cross section of the saddle receiver post 42. Thus, in one embodiment, the tubular coupling body 214 has a non-circular geometry and may, for example, be polygonal in cross section (square in the figures). By way of example and without limitation, the shape may be square, rectangular, triangular, pentagonal, hexagonal, octagonal, etc. in cross section. Other shapes, however, may also be used. While the push handle assembly 202 is shown and described herein as being separate from the foot rest assembly 200, in one embodiment, the push handle assembly 202 and foot rest assembly 200 may be configured as a unitary structure, such as by being integrally coupled together at the respective tubular coupling bodies 204, 214.

The push handle assembly 202 further includes a generally U-shaped member 218 having a middle portion 220 and end portions 222, 224 on either side thereof. The middle portion 220 is configured to be coupled to the elongated member 212 at knuckle 216 in a manner described below. The ends of end portions 222, 224 define handles 226 configured as a gripping point for the parent or adult pushing the tricycle 10. The handles 226 may include grips 227 or other features that facilitate gripping by the parent or adult.

Due to the non-circular cross-sectional shapes, push handle assembly 202 is prevented from rotating relative to the middle frame 14 without any further connecting element. Additionally, the non-circular cross-sectional shapes provide a finite number of relative rotational positions between the push handle assembly 202 and middle frame 14. Accordingly, alignment of the push handle assembly 202 with middle frame 14, and more particularly saddle receiver post 42, during assembly is significantly improved. Furthermore, the loads imposed on the tubes may now be carried by the tubes themselves.

Though relative rotation between the push handle assembly 202 and the saddle receiver post 42 is prevented by the geometry of the tubes, these components may be secured in a manner that prevents them from moving apart from each other (such as along the longitudinal axis of the seat post receiver 42). For example, such a securement would prevent the push handle assembly 202 from undesirably moving or vibrating during use. In this regard, the push handle assembly 202, and more particularly, the tubular coupling body 214 of the illustrated embodiment includes a threaded bore configured to receive a threaded pin having a turn knob 228 that is received therethrough. As those of ordinary skill in the art will appreciate, the knob 228 may be turned to tighten or loosen the connection between the push handle assembly 202 and the saddle receiver post 42.

The coupling between the elongated member 212 and the U-shaped member 218 may be configured as a swivel or pivot joint 230. Such a pivot joint 230 allows the handles 226 to be adjustable based on, for example, the size, desires, etc. of the person pushing the tricycle. Additionally, the pivot joint 230 allows the push handle assembly 202 to be folded into a more compact configuration, which may be beneficial during storage of the tricycle 10 or during packaging and shipping of the tricycle 10 from the manufacturing facility. In an exemplary embodiment, the pivot joint 230 may be configured in a manner similar to pivot joint 56, as described above. Accordingly, the details of joint 230 will not be described herein but reference to the construction and operation of joint 56 will suffice as a description of joint 230. Like many of the previously described connections, the connection between the push handle assembly 202 and saddle receiver post 42 may be achieved without any tools.

In one embodiment, the push handle assembly 202 may include a canopy 232 for providing shade or other protection to the rider of the tricycle. The canopy 232 includes a support frame 233 configured to be coupled to push handle assembly 202, and more particularly, to U-shaped member 218, and a cover 234 for shading the rider. The canopy 232 may be configured to be selectively attachable/removable from the push handle assembly 202 depending on the needs of the user. The canopy may also be foldable so as to have a more compact design when not in use.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. For example, while the improved features disclosed herein have been described in the context of a tricycle, it should be recognized that many of these features may be beneficial to bicycles, scooters and possibly other vehicles, and therefore should not be limited to being applicable only to a tricycle. Thus, the various features of the invention may be used alone or in any combination depending on the needs and preferences of the user.

What is claimed is:

1. A movable vehicle, comprising:
    a first frame member having a handlebar, a front wheel, and a saddle coupled thereto;
    a second frame member having a rear wheel coupled thereto; and
    a pivot joint coupling the first and second frame members so as to be rotatable relative to each other, the pivot joint comprising:
        a first tubular member coupled to the first frame member and having a first end, a second end, and a side wall extending therebetween that defines a passage through the first tubular member;
        a second elongate member coupled to the second frame member and disposed through the passage of the first tubular member so as to be rotatable relative to the first tubular member; and
        a locking mechanism for fixing the relative rotational positions of the first and second frame members, the locking mechanism including at least one projection coupled to one of the first tubular member or second elongate member and at least one aperture formed in the other of the first tubular member or second elongate member, wherein when the at least one projection engages the at least one aperture, the relative rotational positions of the first and second frame members are fixed.

2. The vehicle of claim 1, wherein the at least one projection includes a spring-biased push button.

3. The vehicle of claim 1, further comprising:
    a pair of bushings coupled to the ends of the first tubular member and configured to limit the relative movement of the first and second frame members to substantially only relative rotation.

4. The vehicle of claim 1, wherein the pivot joint permits the vehicle to convert between multiple operating configurations, including a high rider configuration, a low rider configuration, and a storage configuration.

5. A movable vehicle, comprising:
    a first frame member having a front wheel operatively coupled thereto and including a handlebar for turning the front wheel in various directions;
    a second frame member having at least one rear wheel coupled thereto and coupled to the first frame member so that the first frame member is capable of rotating relative to the second frame member; and
    a biasing mechanism operatively coupled to the first and second frame members for biasing the front wheel in a preferred direction.

6. The vehicle of claim 5, wherein the preferred direction is the straight direction.

7. The vehicle of claim 5, wherein the biasing member further comprises:
    a resilient gasket having an exterior shape and coupled to the first frame member so as to move therewith; and
    a cavity having an interior shape corresponding at least partially to the exterior shape of the resilient gasket and coupled to the second frame member,
    wherein the gasket is configured to be received within the cavity such that as the handlebar is turned, the gasket is compressed against the cavity to generate a biasing force in a direction opposite to the direction in which the handlebar is being turned.

8. The vehicle of claim 7, wherein the second frame member includes a head tube having a lower head tube spacer, the lower tube spacer defining the cavity in which the resilient gasket is disposed.

9. A movable vehicle, comprising:
    a first frame member having a first stem portion operatively coupled to a handlebar and a second stem portion operatively coupled to a front wheel, the first and second stem portions being coupled to permit the handlebar to turn the front wheel in various directions;
    a second frame member having a saddle receiver post and at least one rear wheel coupled thereto, the second frame member being coupled to the first frame member so that the first frame member is capable of rotating relative to the second frame member;
    a saddle having a base post configured to be coupled to the saddle receiver post, wherein the base post and the saddle receiver post have corresponding polygonal cross-sectional shapes, thereby permitting only telescoping relative movement of the base post and the saddle receiver post, and
    a foot rest assembly coupled to the saddle receiver post, the foot rest assembly including a tubular coupling body having a polygonal cross sectional shape corresponding to the saddle receiver post.

10. The vehicle of claim 9, wherein the foot rest assembly further comprises a pair of legs coupled to the tubular coupling body and a pair of opposing footrest pegs coupled to the pair of legs, the footrest pegs configured to receive and support the feet of a rider.

11. A movable vehicle, comprising:
    a first frame member having a first stem portion operatively coupled to a handlebar and a second stem portion operatively coupled to a front wheel, the first and second stem portions being coupled to permit the handlebar to turn the front wheel in various directions;
    a second frame member having a saddle receiver post and at least one rear wheel coupled thereto, the second frame member being coupled to the first frame member so that the first frame member is capable of rotating relative to the second frame member;
    a saddle having a base post configured to be coupled to the saddle receiver post, wherein the base post and the saddle receiver post have corresponding polygonal cross-sectional shapes, thereby permitting only telescoping relative movement of the base post and the saddle receiver post, and
    a push handle assembly coupled to the saddle receiver post, the push handle assembly including a tubular coupling body having a polygonal cross sectional shape corresponding to the saddle receiver post.

12. The vehicle of claim 11, wherein the push handle assembly further comprises:
    a first body portion including the tubular coupling body;
    a second body portion including a pair of handles; and
    a pivot joint coupling the first and second body portions so as to be rotatable relative to each other, thereby permitting adjustment of the pair of handles to accommodate persons of various sizes pushing the vehicle.

13. The vehicle of claim 12, wherein the pivot joint comprises:
- a first tubular member coupled to the first body portion and having a first end, a second end, and a side wall extending therebetween that defines a passage through the first tubular member;
- a second elongate member coupled to the second body portion and disposed through the passage of the first tubular member so as to be rotatable relative to the first tubular member; and
- a locking mechanism for fixing the relative rotational positions of the first and second body portions, the locking mechanism including at least one projection coupled to one of the first tubular member or second elongate member and at least one aperture formed in the other of the first tubular member or second elongate member, wherein when the at least one projection engages the at least one aperture, the relative rotational positions of the first and second frame members are fixed.

14. The vehicle of claim 11, further comprising:
- a biasing mechanism operatively coupled to the first and second frame members for biasing the front wheel in a preferred direction.

15. The vehicle of claim 14, wherein the biasing member further comprises:
- a resilient gasket having an exterior shape and coupled to the first frame member so as to move therewith; and
- a cavity having an interior shape corresponding at least partially to the exterior shape of the resilient gasket and coupled to the second frame member,
- wherein the gasket is configured to be received within the cavity such that as the handlebar is turned, the gasket is compressed against the cavity to generate a biasing force in a direction opposite to the direction in which the handlebar is being turned.

16. The vehicle of claim 9, further comprising:
- a locking mechanism for locking the relative positions of the base post and the saddle receiver post, wherein the locking mechanism includes at least one movable projection coupled to one of the base post and the saddle receiver post and at least one aperture formed in the other of the base post and the saddle receiver post, wherein when the at least one movable projection engages the at least one aperture, the relative positions of the base post and the saddle receiver post are fixed.

* * * * *